Feb. 2, 1960  R. S. HINSEY  2,923,168
MECHANISM CONTROL
Filed Aug. 16, 1954  3 Sheets-Sheet 1
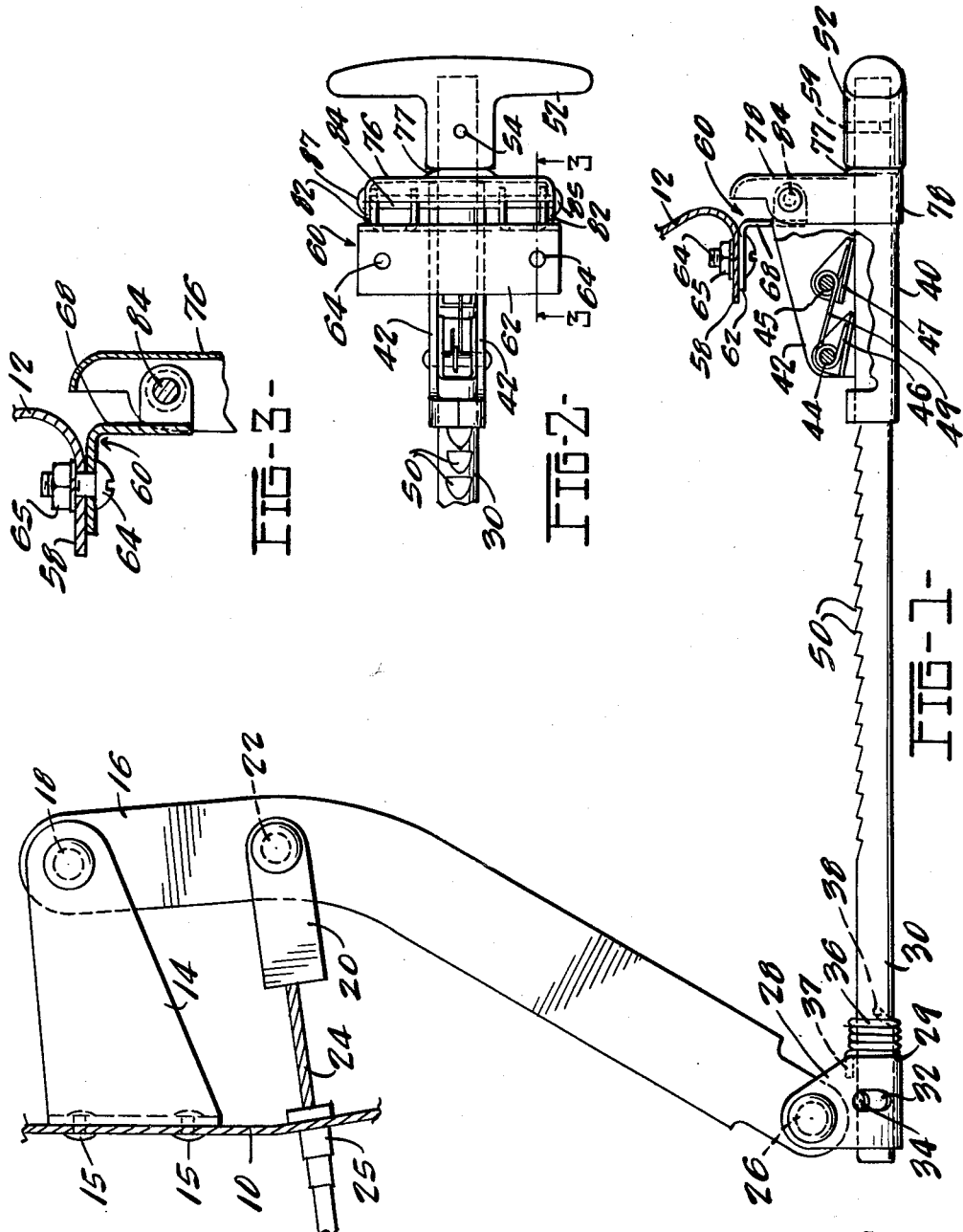
Inventor:
ROBERT S. HINSEY.
By
Harry O. Ernsberger
Attorney Feb. 2, 1960 R. S. HINSEY 2,923,168
MECHANISM CONTROL
Filed Aug. 16, 1954 3 Sheets-Sheet 2
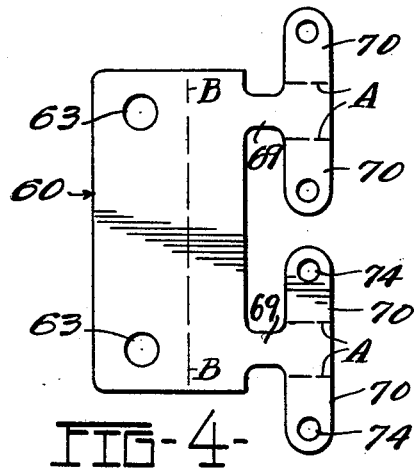
FIG-4-
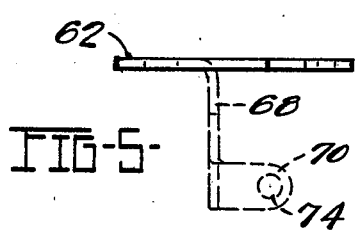
FIG-5-
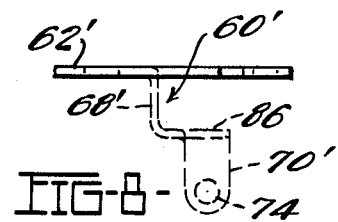
FIG-8-
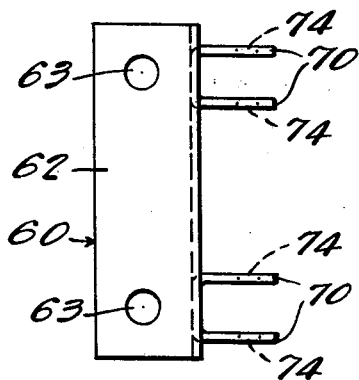
FIG-6-
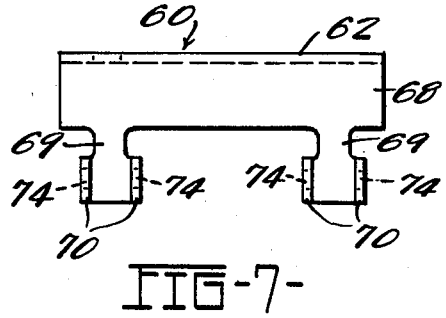
FIG-7-
Inventor:
ROBERT S. HINSEY.
By
Harry O. Erneberger
Attorney

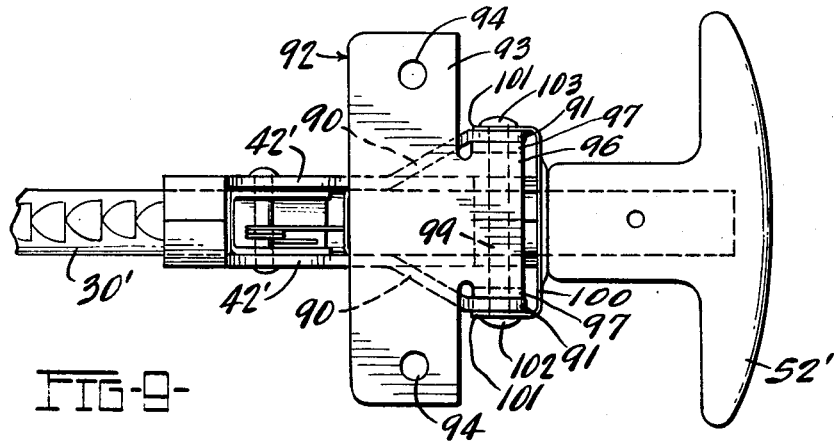
FIG-9-
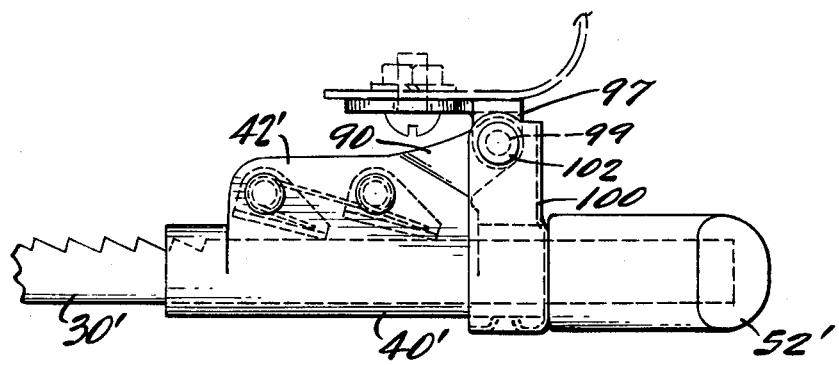
FIG-10-
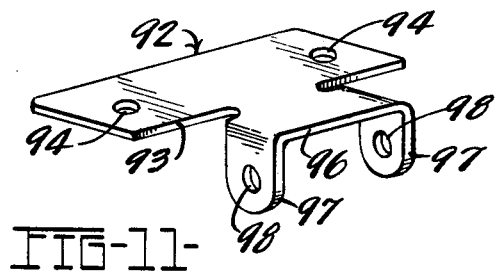
FIG-11-

United States Patent Office 2,923,168
Patented Feb. 2, 1960

2,923,168

MECHANISM CONTROL

Robert S. Hinsey, Toledo, Ohio, assignor, by mesne assignments, to The Bingham-Herbrand Corporation, a corporation of Ohio Application August 16, 1954, Serial No. 449,954

3 Claims. (Cl. 74—503)

This invention relates to mechanism-actuating or controlling devices and more particularly to a device adapted for controlling the parking or emergency brake mechanism of an automotive vehicle.

An arrangement that has been in conventional use for controlling the parking or emergency brake mechanism of a vehicle is inclusive of a construction embodying a pull rod operatively engaged engaged with a lever member which is connected with the brake mechanism. The construction is provided with pawl means for retaining the pull rod in an extended or brake-setting position. The pawl means is mounted in a sheet metal housing which heretofore has been supported from the vehicle instrument panel by a hinge construction wherein extensions of the pawl housing or supporting means and a hinge plate have been formed with portions curled about a hinge pin. Such an arrangement is shown in my Letters Patent No. 2,671,353, granted March 9, 1954. A hinge construction of the above-mentioned character is difficult and expensive to manufacture as several successive forming or bending operations are required to form the curls on both the pawl housing and the hinge plate. Furthermore, the processing operations to produce the curl configurations set up stresses in the metal which, after a limited period, tend to cause the curls to open up, resulting in lost motion in the connection with attendant noise due to vibration set up by the vehicle engine and vibration of the vehicle caused by road irregularities. If the curls are initially closed during formation to smaller diameters than the diameter of the hinge pin in an endeavor to compensate for the stress reaction in the formed metal, then a binding usually occurs between the hinge pin and the curls which impairs the proper functioning of the hinge construction.

An object of the present invention resides in a mounting arrangement and method of making same for a pull-type brake-actuating device wherein the brake-actuating device may be operated without any binding of the mechanism.

Another object is the provision of an articulate connection for supporting a mechanism-controlling device which avoids lost motion and which is capable of long life with a minimum of wear of the components forming the articulate connection.

Another object of the invention is the provision of a mounting means for a pull-type brake-actuating device embodying a novel hinge construction for articulately supporting the device.

A further object of the invention is the provision of a mounting means for a brake control apparatus which is inclusive of a hinge construction which is economical to manufacture and which provides a stable, articulate means for supporting the brake control apparatus.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a form of actuating or controlling means of the invention utilized for operating a vehicle brake mechanism;

Figure 2 is a top plan view of a portion of the construction shown in Figure 1;

Figure 3 is an enlarged fragmentary detail sectional view taken substantially on the line 3—3 of Figure 2;

Figure 4 is a plan view of a sheet metal blank fashioned to a contour to produce a form of hinge plate forming a component of the invention;

Figure 5 is an end elevational view of the blank shown in Figure 4, illustrating a step in the formation of the hinge plate forming part of the mechanism-mounting means of the invention;

Figure 6 is a top plan view of the hinge plate construction of Figure 5;

Figure 7 is a front elevational view of the construction shown in Figure 6;

Figure 8 is a plan view illustrating a modified form of hinge plate;

Figure 9 is a top plan view of mechanism-actuating means illustrating a modified form of mounting means;

Figure 10 is a side elevational view of the construction shown in Figure 9, and

Figure 11 is an isometric view of the form of hinge plate embodied in the construction shown in Figures 9 and 10.

While I have shown a form of the invention as adapted for use in operating or controlling the emergency or parking brakes of an automotive vehicle, it is to be understood that I contemplate the utilization of the invention with other forms of mechanism control wherein it may be found to have utility.

Referring to the drawings in detail and with particular reference to Figure 1, there is illustrated a portion of a fire wall or dashboard 10 of an automotive vehicle, a portion of the vehicle instrument panel being illustrated at 12. Mounted on the fire wall 10 is a bracket 14 secured thereto by means of rivets 15. A lever 16 is fulcrumed upon the bracket 14 by means of a stub shaft or rivet 18. Secured to the lever 16 intermediate its ends is a clevis 20 which straddles the lever and is connected thereto by means of a pin or rivet 22. A flexible cable 24 is anchored at one end to the clevis 20, the cable passing through a rubber grommet 25 mounted in an opening in the fire wall 10. The cable 24 is connected with the emergency or parking brake mechanism (not shown) of the vehicle.

Pivotally secured to the lower end of the lever 16 by means of a rivet or stub shaft 26 is a generally U-shaped bracket 28 having a substantially cylindrical configuration 29 to receive and accommodate a longitudinally movable member or pull rod 30. The wall of the cylindrical or bight portion 29 of the bracket 28 receiving the end zone of the rod 30 is formed with a slot 32 to accommodate a pin 34 mounted in a transverse opening formed in the pull rod 30. The pin-and-slot arrangement provides for a limited rotational movement of the pull rod with respect to the bracket 28, the end walls of the slot engaged by the pin 34 defining the limit of rotation of the pull rod. A resilient member in the form of a coil spring 36 has one end 37 thereof in engagement with the bracket 28, the other end 38 extending into a transverse opening formed in the pull rod 30. The spring 36 serves to resiliently bias the pull rod 30 to one position of rotation.

The pull rod 30 is supported adjacent the instrument panel 12 by means forming part of the invention. Partially surrounding the pull rod 30 is a sheet metal bracket or housing 40, preferably of U-shaped configuration, having parallel side wall portions 42, the bight portion of the housing 40 forming a trough-like support for the pull rod 30 in the manner shown in Figure 1. The parallel wall portions 42 are formed with transverse openings in which are disposed pins or stub shafts 44 and 45, providing pivotal supports for pawls or pawl members 46 and 47. A spring 49 is fashioned with portions engageable with the pawls 46 and 47 and serves to continuously urge or bias the pawls into engagement with the exterior surface of the pull rod 30. The pull rod 30 is formed with a plurality of teeth 50 arranged in longitudinally aligned relation along the shaft or pull rod 30. The pull rod 30 is provided at its free end with a manipulating grip or handle 52 secured to the pull rod 30 by means of a pin 54.

The present invention is inclusive of means for articulately supporting the pawl housing 40 and hence the pull rod 30 from the instrument panel 12 or other suitable mounting member. In the illustrated embodiment the instrument panel 12 is formed with a substantially horizontal portion or flange 58. A hinge plate or member 60 is formed with a horizontal portion 62 which is contiguously arranged with the horizontal portion or flange 58 of the instrument panel. The horizontal portion 62 of the hinge plate 60 and the flange 58 of the instrument panel are formed with aligned openings 63 adapted to receive bolts 64 and nuts 65 for securing the hinge plate or member 60 to the instrument panel.

The hinge plate is formed of sheet metal and the horizontal portion 62 is integrally joined with a depending portion 68 from which extends spaced neck or connecting portions 69, each joined with a pair of fingers or portions 70, the fingers being formed with openings 74 which, as shown in detail in Figures 6 and 7, are in aligned relation. Disposed at the forward zone of the bracket 40 is an escutcheon or member 76 provided with a raised portion 77 having an opening therethrough to accommodate slidable movement of the pull rod 30. The escutcheon 76 is formed with a portion 78 embracing an end zone of the pawl housing 40 and may be spot-welded or otherwise secured to the bracket or pawl housing 40 as shown in Figure 1.

The escutcheon 76 is formed with parallel side walls 82 having openings formed therein adapted to be aligned with the openings 74 formed in the hinge plate 60. The parallel wall portions 42 of the bracket or pawl box construction 40 are formed with openings adapted to be aligned with the openings 74 formed in fingers or ear portions 70 of the hinge plate. A hinge pin, pintle or shaft 84 is adapted to extend through the openings in the escutcheon plate 76, openings 74 in the ear portions 70 of the hinge plate and openings in the walls 42 of the pawl housing 40 to articulately or pivotally support the escutcheon 76, bracket 40 and, hence, the pull rod arrangement from the hinge plate 60.

The pin 84 is provided at one end with a head 85 and, after assembly, the opposite end portion of the pin 84 is swaged to the configuration shown at 87 to hold the hinge plate 60, escutcheon 76 and bracket 40 in assembled relation. The articulate connection for the pull rod 30 and its associated elements is necessary as the swinging movements of the lever 16 about the pivotal axis of the pin 18 causes a rocking or oscillatory movement of the pull rod construction which, in the present construction, occurs about the axis of the hinge pin or shaft 84.

A method of forming the hinge plate 60 is illustrated in Figures 4 through 7. The sheet metal blank for forming the hinge plate construction is shown in Figure 4 and includes the horizontal portion 62, portion 68, neck portions 69 and the fingers or ear portions 70. The pairs of portions 70 forming the pintle-receiving means of the hinge construction are bent at right angles to the portions 68 and 69 along the lines A shown in Figure 4. The plate 60 is then bent along the line B—B shown in Figure 4 to the position shown in broken lines in Figure 5 whereby the finished hinge plate construction appears as in Figures 6 and 7.

By fashioning a hinge plate in this manner, ample bearing surface is provided by the two pairs of ear portions 70 for the hinge pin 84 so that little or no wear will ensue over an extended period of use of the pull rod construction. This method of forming the hinge plate construction simplifies the manufacturing of the arrangement as compared with prior hinge constructions. In the present hinge plate construction only two bending operations are required, viz., forming the pairs of portions 70 into parallelism and forming or bending the plate along the line B—B to the configuration shown in Figure 5.

The arrangement of parts in the position illustrated in Figure 1 is with the brake mechanism in released position. When it is desired to set the brake mechanism, the operator grasps the handle or grip portion 52 and draws the pull rod 30 in a righthand direction, as viewed in Figure 1, which results in a counterclockwise movement of lever 16 about its fulcrum 18, exerting a pull on the cable 24 and setting the brake mechanism. During this operation, the pull rod 30 and bracket or pawl box or housing 40 move through an arcuate path about the axis of hinge pin 87, the articulation provided by the above-described hinge arrangement preventing any binding action during movements of the pull rod and lever 16. One of the pawls 46 or 47 engages a tooth in the linear group of teeth 50 formed on the pull rod and prevents retractive movement of the pull rod, thus holding the brake mechanism of the vehicle in a set position. When it is desired to release the brake mechanism, the operator grasps the handgrip 52 and rotates the pull rod 30 through an angular distance permitted by the extent of movement of the pin 34 in the slot 32 to move the teeth 50 out of the path of the pawls 46 and 47. Such rotation of the pull rod disengages the pawls from the teeth 50, the operator sliding the pull rod to its retracted or brake-release position shown in Figure 1. Upon release by the operator of the grip member 52, the force of spring 36 is effective to rotate the pull rod 30 until the pin 34 engages the end wall of the slot 32, in which position the teeth 50 in the pull rod 30 are aligned with the pawls 46 and 47 in position for a subsequent brake-setting operation of the mechanism.

The hinge plate construction may be fashioned to the configuration shown in Figure 8. In this form the hinge plate 60' consists of a horizontal portion 62', a vertical portion 68', a forwardly extending portion 86 and depending portions 70'. The depending portions 70' provided with openings 74' to accommodate a hinge pin. The openings 74' are aligned and are adapted to receive a hinge pin or pintle in the same manner as the construction shown in Figures 1 and 2.

Figures 9 and 10 illustrate a mechanism control embodying a modified form of hinge plate construction shown in Figure 11. In this arrangement, a pull rod 30' extends through a bracket or pawl box 40', the parallel wall portions 42' having outwardly extending ear portions 90 which terminate in parallel portions or walls 91. A hinge plate construction 92, shown in Figure 11, is formed with a horizontal portion 93 provided with openings 94 adapted to receive securing bolts for fastening the hinge plate to the instrument panel or other support in the manner shown in Figure 3. A horizontal portion 96 is formed with downwardly extending, parallel ear portions 97 which are formed with openings 98 aligned with those in the wall portions 91 of the bracket 40'. Extending through the openings in the portions 91 and the ear portions 97 is a hinge pintle or shaft 99, forming a pivotal or articulate connection between the hinge plate 92 and the bracket or pawl housing 40'. An escutcheon member 100 is disposed forwardly of the bracket 40' and is formed with parallel wall portions 101 formed with openings through which extends the hinge pintle 98. The pin 98 is formed at one end with a head 102 and, after assembly with the bracket 40, hinge plate 92 and escutcheon 100, is swaged at the other end to form a head as indicated at 103 to secure these elements in assembled relation.

The construction shown in Figures 9, 10 and 11 provides a simple and inexpensive hinge construction for supporting a pull rod arrangement which may be made from sheet metal with a minimum of forming operations and at low cost. The arrangement illustrated in Figures 9 and 10 functions in the manner of the construction shown in Figures 1 and 2.

It is apparent that, within the scope of the invention, modifications and different arrangements may be made other than is herein disclosed, and the present disclosure is illustrative merely, the invention comprehending all variations thereof.

I claim:

1. Mechanism control including, in combination, a longitudinally slidable member, a bracket supporting the member, one end of said member adapted to be connected with mechanism to be controlled, a manipulating means carried by the other end of said longitudinally slidable member, means associated with said bracket for holding the longitudinally movable member in adjusted positions, means for supporting the bracket for relative pivotal movement including a plate having a uniplanar portion, said plate being formed with spaced pairs of projecting parallel portions having their major surfaces in right-angular relation to the uniplanar portion, said pairs of parallel portions having openings formed therein in aligned relation, said bracket having portions formed with openings aligned with the openings in said parallel portions, and a pin extending through the openings in the pairs of parallel projecting portions of the plate and bracket.

2. Mechanism control including, in combination, a longitudinally slidable member, a bracket supporting the member, one end of said member adapted to be connected with mechanism to be controlled, a manipulating member carried by the other end of the said longitudinally slidable member, clutch means associated with said bracket for holding the longitudinally movable member in adjusted positions, a hinge plate having a uniplanar portion, two pairs of transversely spaced fingers integrally joined with the uniplanar portion, said fingers having their major surfaces arranged in substantially parallel planes disposed at right angles to the plane of the uniplanar portion, said pairs of fingers having openings formed therein, said bracket having portions provided with openings adapted to be aligned with the openings in said pairs of fingers, and a hinge pin extending through the openings in said bracket and said pairs of fingers for hingedly supporting the bracket from the hinge plate.

3. Mechanism control including, in combination, a longitudinally slidable member having a clutch surface formed thereon, means engaging said member including a housing, clutch means in said housing adapted for cooperation with the clutching surface on said longitudinally slidable member for holding the latter in adjusted position relative to said housing, a hinge plate having a uniplanar portion and transversely spaced pairs of fingers projecting therefrom, said pairs of fingers having their major surfaces in parallel relation and disposed substantially at right angles to the uniplanar portion of the hinge plate, said housing having portions formed with openings arranged to be aligned with the openings in said pairs of fingers, an escutcheon disposed adjacent said housing and having openings adapted to be aligned with the openings in said housing and said pairs of fingers, and a hinge pin extending through the openings in said escutcheon, housing and pairs of fingers for pivotally supporting the housing and escutcheon from the hinge plate.

References Cited in the file of this patent

UNITED STATES PATENTS

| | | |
|---|---|---|
| 984,594 | O'Rourke | Feb. 21, 1911 |
| 1,431,662 | Horning | Oct. 10, 1922 |
| 1,508,008 | Bowen | Sept. 9, 1924 |
| 1,767,575 | Bujack | June 24, 1930 |
| 2,377,691 | Jandus | June 5, 1945 |
| 2,395,215 | Cochrane | Feb. 19, 1946 |
| 2,460,171 | Gessler | Jan. 25, 1949 |
| 2,558,558 | Hinsey | June 26, 1951 |
| 2,669,883 | Duncan | Feb. 23, 1954 |
| 2,669,884 | Sandberg | Feb. 23, 1954 |
| 2,787,168 | Roesch | Apr. 2, 1957 |